US011006319B2

United States Patent
Allan

(10) Patent No.: US 11,006,319 B2
(45) Date of Patent: May 11, 2021

(54) 5G FIXED MOBILE CONVERGENCE USER PLANE ENCAPSULATION

(71) Applicant: Telefonaktiebolaget LM Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 75 days.

(21) Appl. No.: 16/553,878

(22) Filed: Aug. 28, 2019

(65) Prior Publication Data

US 2021/0022041 A1 Jan. 21, 2021

Related U.S. Application Data

(60) Provisional application No. 62/875,928, filed on Jul. 18, 2019.

(51) Int. Cl.
| | |
|---|---|
| *H04W 28/08* | (2009.01) |
| *H04L 12/16* | (2006.01) |
| *H04L 29/08* | (2006.01) |
| *H04W 28/02* | (2009.01) |
| *H04L 12/66* | (2006.01) |
| *H04L 12/64* | (2006.01) |
| *H04W 88/16* | (2009.01) |

(52) U.S. Cl.
CPC .............. *H04W 28/08* (2013.01); *H04L 12/66* (2013.01); *H04L 69/324* (2013.01); *H04W 28/0268* (2013.01); *H04L 2012/6421* (2013.01); *H04L 2212/00* (2013.01); *H04W 88/16* (2013.01)

(58) Field of Classification Search
CPC . H04W 28/08; H04W 28/0268; H04W 88/16; H04L 12/66; H04L 69/324; H04L 2012/6421; H04L 2212/00; H04L 12/4633
See application file for complete search history.

(56) References Cited

U.S. PATENT DOCUMENTS

| | | | |
|---|---|---|---|
| 2005/0033853 A1* | 2/2005 | Jones | H04M 11/062 709/230 |
| 2013/0089013 A1* | 4/2013 | Camera Ros | H04L 47/20 370/310 |
| 2013/0265997 A1* | 10/2013 | Gu | H04W 36/0038 370/338 |
| 2019/0132707 A1* | 5/2019 | Prasad | H04L 41/0816 |

OTHER PUBLICATIONS

RFC 2516: Mamakos, et al., "A Method for Transmitting PPP Over Ethernet (PPPoE)," The Internet Society, Network Working Group, Request for Comments: 2516, Feb. 1999, 17 pages.

\* cited by examiner

*Primary Examiner* — Maharishi V Khirodhar
*Assistant Examiner* — Kenneth P Hunt
(74) *Attorney, Agent, or Firm* — NDWE, LLP

(57) ABSTRACT

A method is implemented by a network device that receives a packet at an access gateway function from a residential gateway, detects an Ethertype for the received packet, detects a version for the received packet, looks up session and state information for the packet as a result of the detecting of the Ethertype and the version indicating that the packet is a fixed mobile convergence (FMC) user plane (UP) encapsulation, and processes the packet according to policies for FMC UP encapsulation.

20 Claims, 10 Drawing Sheets

FIG. 7A
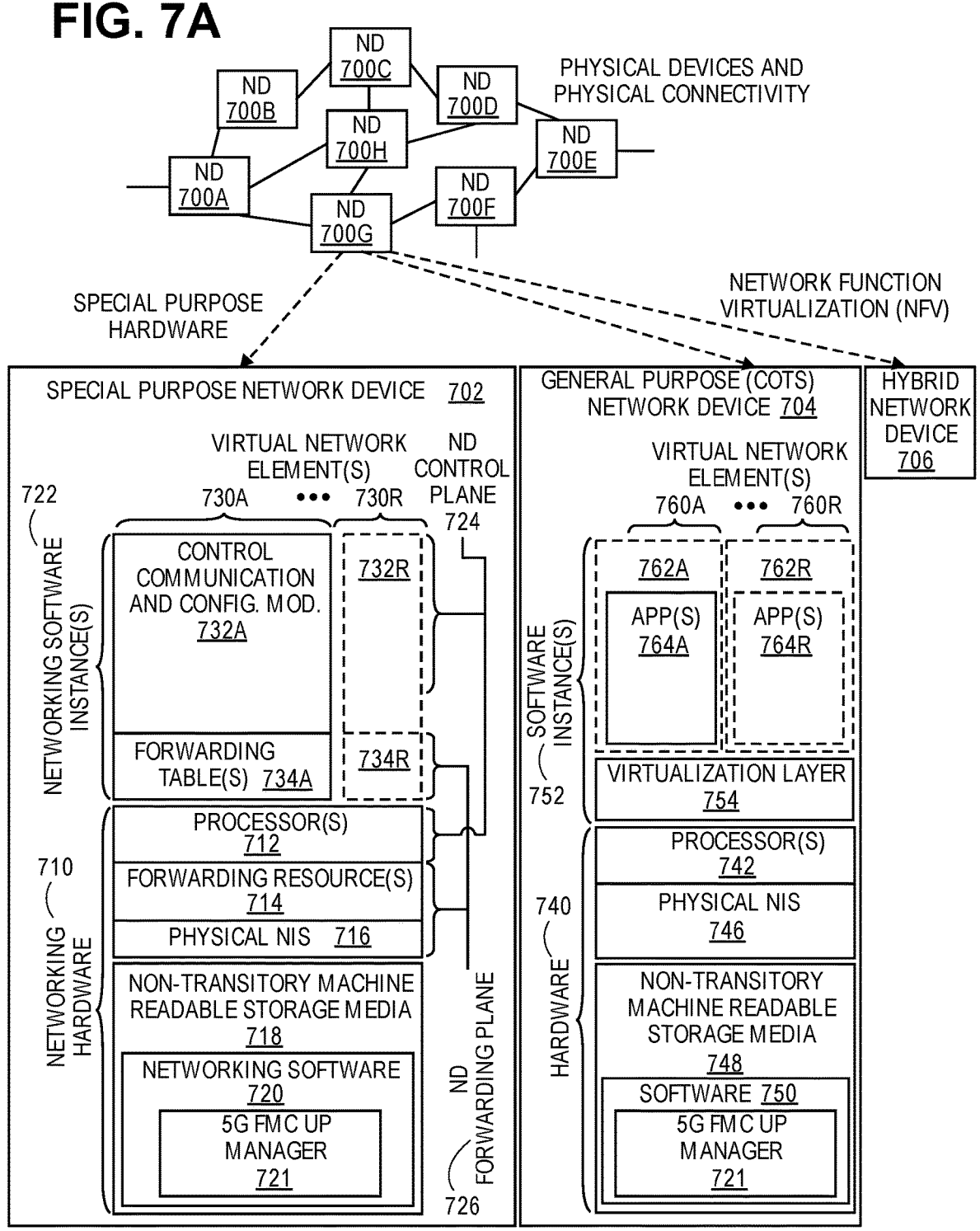
FIG. 7B

5G FIXED MOBILE CONVERGENCE USER PLANE ENCAPSULATION

CROSS-REFERENCE TO RELATED APPLICATIONS

This application claims the benefit of U.S. Provisional Application No. 62/875,928, filed Jul. 18, 2019, which is hereby incorporated by reference.

TECHNICAL FIELD

Embodiments of the invention relate to the field of 5G (fifth generation cellular network technology) communication; and more specifically, to enabling support for wireline access to the 5G network core (5GC).

BACKGROUND ART 5G provides a new avenue for providing fixed access to broadband in a residential context. This utilization of 5G is referred to as fixed mobile convergence. In this context, residential broadband can be provided to any number of user devices including mobile handsets, computers, tablets, and other computing devices that connect to a residential gateway or similar customer premise equipment. The residential gateway then may connect with the 5G network via wireline access facilities such as a passive optical network (PON) or digital subscriber line (DSL) in addition to the possibility of fixed wireless access (FWA).

The deployment of 5G wireline access typically will involve an intervening Ethernet based legacy access network often based upon the Broadband Forum TR-101 and related specifications. This will be for the purposes of meeting wholesale or regulatory requirements and differs from the radio architecture where traffic is adapted onto 5G at a radio base station of a cellular network with no intervening network. Converged 5G wireline networks carry user data between 5G residential gateways (5G-RG) and a 5G Access Gateway Function (i.e., a fixed network (F)-AGF) across deployed access networks. The transport encapsulation used between the 5G-RG and the F-AGF needs to meet a variety of requirements including the ability to multiplex multiple logical connections (protocol data unit (PDU) sessions) within a virtual local area network (VLAN) identified point to point (p2p) logical circuit between a 5G-RG and an F-AGF. Life cycle management of PDU sessions is performed via 5G control plane interactions between the user equipment (in the wireline case at a 5G-RG) and the 5G Core.

Point to point protocol (PPP) over Ethernet (PPPoE) is a protocol commonly used in wireline networks and has been deployed for some 20 years. PPPoE provides mechanisms for session multiplexing and employs a hierarchy of protocols (link control protocol (LCP), network control protocol (NCP) and similar protocols) to perform session lifecycle management via user plane transactions. PPPoE is typically transported over a provisioned and VLAN delineated access circuit.

Many access networks implement specific proprietary features based upon snooping of specific fields in PPPoE encapsulated data packets. They may also block Ethernet frames with unrecognized Ethertypes. Some access nodes in the data path between the 5G-RG and the F-AGF (such as DSLAMs and OLTs) currently snoop packets identified by specific Ethertypes to identify protocols such as PPPoE, Internet Protocol (IP), address resolution protocol (ARP), and Internet Group Management protocol (JUMP). This may be for the purpose of enhanced Quality of Service (QoS), policing of identifiers and other applications. Some deployments are depended upon this snooping. Such devices are currently able to perform snooping for PPPoE or IPoE packet encodings but would be unable to do so if a new encapsulation, or an existing encapsulation using a new Ethertype was utilized. In addition, fixed access is very sensitive to the complexity of residential gateways, therefore encapsulation overhead and efficiency is an important consideration.

SUMMARY

In one embodiment, a method is implemented by a network device that receives a packet at an access gateway function from a residential gateway, detects an Ethertype for the received packet, detects a version for the received packet, looks up session and state information for the packet as a result of the detecting of the Ethertype and the version indicating that the packet is a fixed mobile convergence (FMC) user plane (UP) encapsulation, and processes the packet according to policies for FMC UP encapsulation.

In another embodiment, a method is implemented by a network device that receives a packet at an access gateway function from a network core, determines a session ID for the received packet for a FMC UP encapsulation using meta data from a general packet radio service (GPRS) tunneling protocol (GTP)—user plane (U) header of the received packet, generates a FMC UP packet populated with a payload from the received packet and header information derived from the GTP-U header, and forwards the FMC UP encapsulated packet to a residential gateway.

In a further embodiment, a method is implemented by a network device that receives a packet at a residential gateway from an access gateway function, detects an Ethertype for the received packet, detects a version for the received packet, looks up session and state information for the packet as a result of the detecting of the Ethertype and the version indicating that the packet is a fixed mobile convergence (FMC) user plane (UP) encapsulation, processes the packet according to policies for FMC UP encapsulation, and generates a local area network packet from the packet by copying the payload of the packet and determining local area network packet header information from session information.

In one embodiment, a method is implemented by a network device that receives a packet at a residential gateway from a user device in a local area network, determines a session ID for the received packet for a fixed mobile convergence (FMC) user plane (UP) encapsulation using header data from the packet, generates a FMC UP packet populated with a payload from the received packet and header information derived from session state, and forwards the FMC UP encapsulated packet to an access gateway function.

BRIEF DESCRIPTION OF THE DRAWINGS

The invention may best be understood by referring to the following description and accompanying drawings that are used to illustrate embodiments of the invention. In the drawings:

FIG. 7A illustrates connectivity between network devices (NDs) within an exemplary network, as well as three exemplary implementations of the NDs, according to some embodiments of the invention.

FIG. 7B illustrates an exemplary way to implement a special-purpose network device according to some embodiments of the invention.

DETAILED DESCRIPTION

Figure 1A:
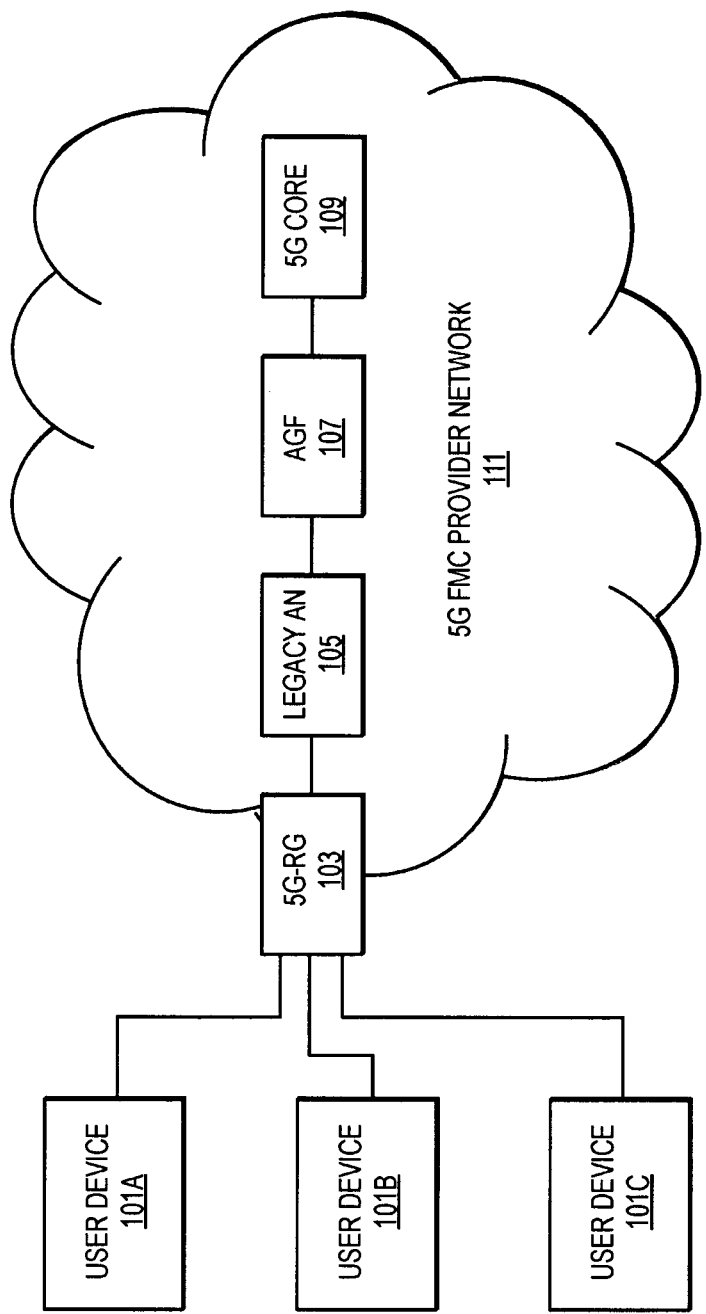
FIG. 1A is a diagram of one embodiment of a network implementing fixed mobile convergence.

The following description describes methods and apparatus for enabling expanded functionality for 5G in 5G fixed mobile convergence scenarios. The embodiments enable multiplexing of 5G protocol data unit (PDU) sessions over an Ethernet virtual circuit, and the encoding of additional quality of service (QOS) metadata relative to prior point to point protocol over Ethernet (PPPoE). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

As part of providing wireline access to the 5G core for residences, deployed wireline networks carry user data between 5G residential gateways (5G-RG) and the 5G Access Gateway Function (AGF). The traffic between the 5G-RG and AGF is encapsulated to traverse the intermediate network devices along a data path. The encapsulation used between the 5G-RG and the AGF needs to meet a variety of requirements including being able to multiplex the traffic of multiple protocol data unit (PDU) sessions within a virtual local area network (VLAN) delineated access circuit, to permit legacy network devices in the data path to identify the protocol as one that is already recognized and snoop certain packet fields, to carry 5G quality of service (QoS) information associated with the data, and to be efficiently encoded. The embodiments provide a fixed mobile convergence (FMC) user plane (UP) encapsulation that meets these requirements as well as a set of processes at the 5G-RG and AGF to process this encapsulation.

FIG. 1A is a diagram of one embodiment of a network implementing fixed mobile convergence including support for the FMC UP encapsulation embodiments. A provider network 111, such as a converged 5G ("fifth generation") wireline network provides broadband Internet access to residences via a combination of cellular and wired technology. In one embodiment, the provider network 111 carries user data between 5G-RGs the 5G AGF across both wired and wireless connections (e.g., over deployed TR-101 and TR-178 access networks).

A residential network consists of a set of user devices 101A-C connected to the 5G-RG via wired and wireless access technologies (e.g., Ethernet, WiFi and similar technology). Any number of user devices 101A-C can be connected to a 5G-RG 103. The 5G-RG 103 connects the residence to the function of the provider network 111 and services of the wider Internet via the 5G core (5GC) network 109. Communication within the residence and between the user devices 101A-C and the 5G-RG 103 is based on local area network technologies, in particular Ethernet. Communication between some classes or groups of home user devices and the 5G core may be via different PDU sessions possibly supporting different network slices, and one of the roles of the 5G-RG is to map home user devices to the appropriate PDU sessions and vice versa.

Many of the functions of mapping access onto the 5G Core 109 are provided by the AGF 107. The communication between the 5G-RG 103 and the AGF 107 utilizes a transport encapsulation that needs to meet a variety of requirements. The requirements of the transport encapsulation include the ability to multiplex multiple logical connections (i.e., multiple protocol data unit (PDU) sessions) within a virtual local area network (VLAN) identified point to point (p2p) logical circuit between the 5G-RG and the AGF (sometimes referred to as a fixed network (F)-AGF). The transport encapsulation also must allow unmodified legacy equipment in the data path (e.g., the legacy access node (AN) 105) to identify the encapsulation and snoop (i.e., access) specific fields in the payload. Some access nodes in the data path between the 5G-RG and the F-AGF (e.g., Digital Subscriber Loop Access Multiplexers (DSLAMs) and optical line terminators (OLTs)) currently inspect packets identified by specific Ethertypes to identify protocols such as PPPoE, Internet Protocol (IP), address resolution protocol (ARP), and Internet Group Management Protocol (IGMP). The inspection of packets by the legacy network devices may be for the purpose of enhanced QoS management, policing of identifiers, and other applications. The operation of some provider networks 111 are dependent upon this type of packet inspection. The legacy network devices are currently able to do packet inspection for PPPoE or IPoE packet encodings but would be unable to do so if a new type of encapsulation, or an existing encapsulation using a new Ethertype, were used.

The embodiments provide a FMC UP encapsulation that meets these requirements and also enables the encapsulation to carry per packet 5G QoS information. The embodiments also take into consideration that fixed access is very sensitive to the complexity of residential gateways (e.g., the 5G-RGs), therefore, FMC UP encapsulation involves low overhead and does not negatively impact efficiency.

The FMC UP encapsulation modifies PPPoE data encapsulation (e.g., as defined in RFC 2516) to address these requirements. Currently, most deployed access nodes (i.e., legacy network devices) do not police the VER, TYPE and CODE fields of a PPPoE header, and only perform limited policing of stateful functions with respect to the session lifecycle management procedures of PPPoE (e.g., as documented in RFC 2516). The embodiments repurpose the VER, and CODE fields. Specifically, the VER, is repurposed to identify that the mode of operation for packets with FMC UP encapsulation user control plane (e.g. non-access stratum (NAS)) based 5G FMC session establishment and life cycle maintenance procedures instead of legacy PPP/PPPoE session establishment procedures (i.e., PPPoE Active Discovery Initiation (PADI) discipline, link control protocol (LCP), network control protocol (NCP) and similar PPP/PPPoE procedures). The FMC UP encapsulation permits the session identifier (ID) field to be used to identify the 5G PDU session the encapsulated packet is part of. The VER is also repurposed to indicate that the CODE field in the version 1 PPPoE header has been repurposed to encode per packet 5G QoS information in the form of 6 bits of QoS Flow Information (QFI) and a 1 bit Reverse QOS Indication (RQI). The FMC UP encapsulation provides an 8-byte data packet header (modified from RFC 2516), which is the most frugal of the encapsulations that are currently supported and recognized by legacy access equipment that can also meet all the requirements for 5G FMC.

Data Encapsulation Format

Figure 1B:
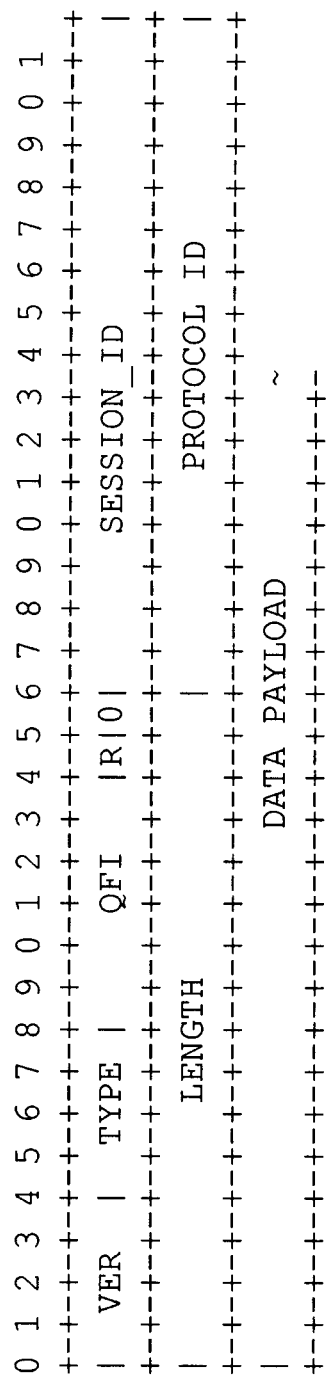
FIG. 1B is an illustration of a 5G FMC UP encapsulation.

PPPoE data packet encapsulation is indicated in an IEEE 802 Ethernet frame by an Ethertype of 0x8864. The information following that Ethertype for the repurposing of the PPPoE data encapsulation as the 5G FMC UP encapsulation uses a value of 2 in the VER field. The 5G FMC UP encapsulation is structured as shown in FIG. 1B.

The description of each field of the FMC UP encapsulation is as follows, the first field VER is the version. The value of VER to indicate FMC UP encapsulation can be 2, or a similar agreed upon value not defined or utilized by PPPoE. The TYPE filed is the message type. The value of this field can be set to 1, or a similar agreed upon value not defined or utilized by PPPoE. The QoS Flow Identifier (QFI) field encodes the 3GPP 5G QFI to be used for mapping 5G QoS to IP DSCP/802.1 P-bits. The R (short for RQI) field encodes the one bit Reflective QoS Indicator which indicates that reply packets that are part of the same bi-directional flow should use the same QoS markings. The 0 field indicates the bit(s) are to be set to zero. The SESSION_ID field is an 16-bit unsigned integer which is used to distinguish different PDU sessions that are in the VLAN delineated multiplex. In other embodiments, the session ID may can range from 8 to 16 bits with 16 bits being an example and the final length being subject to NAS and access stratum procedure design in standardization. In the example embodiment, the session ID is identified as 16 bits to align with 5G NAS procedures and encodings. The LENGTH field is the length in bytes of the data payload including the initial Protocol ID. PROTOCOL ID is the 16 bit identifier of the data payload type (e.g., encoded as per RFC 2516). The following values are valid in the PROTOCOL ID field for 5G FMC UP encapsulation: 0x0021: IPv4; 0x0031: Ethernet; and 0x0057: IPv6. The DATA PAYLOAD field is encoded as per the protocol ID.

Security Considerations

5G NAS procedures used for session life cycle maintenance employ ciphering and integrity protection. Therefore, 5G NAS can be considered a more secure session establishment discipline than existing RFC 2516 procedures, at least against "man in the middle" attacks (i.e. a cyberattack where the attacker secretly intercepts and/or alters communications). The repurposing of the RFC 2516 data by 5G FMC UP encapsulation will not circumvent existing anti-spoofing and other security procedures in deployed equipment. The existing access equipment will be able to identify fields that they normally process and police as per existing RFC 2516 traffic. Therefore, the security of legacy access network devices will be equivalent, or superior, to PPPoE.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FMC UP Encapsulation Usage

Figure 2:
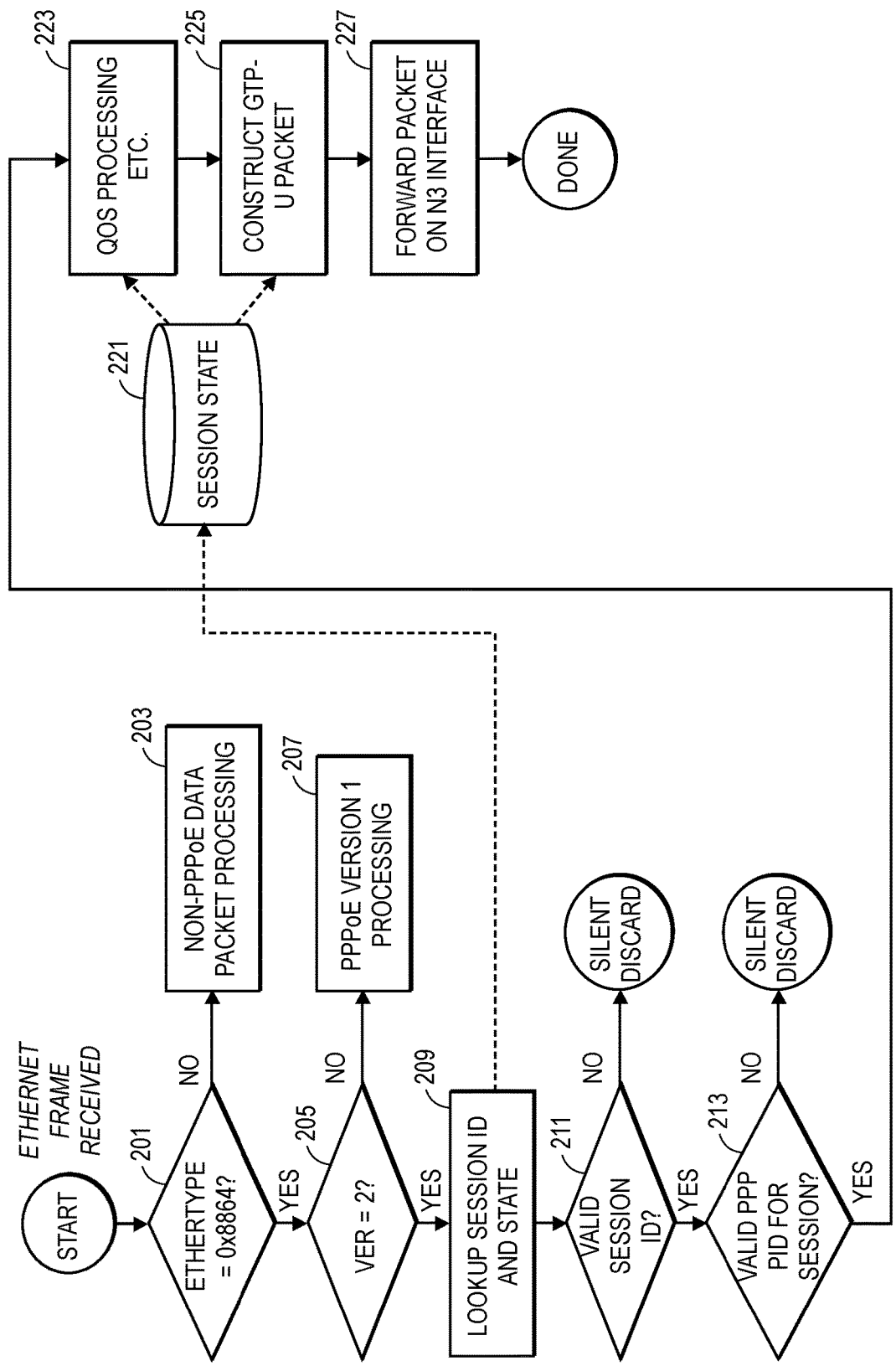
FIG. 2 is a flowchart of one embodiment of a processing of an Ethernet frame at an AGF received from the 5G-RG.

FIG. 2 is a flowchart of one embodiment of a processing of an Ethernet frame at an AGF received from the 5G-RG. The illustrated process describes the processing of an Ethernet frame utilizing the embodiments of the 5G FMC UP encapsulation by the AGF (e.g., a F-AGF) or similar process implemented by a network device in the provider network.

In this example embodiment of the process, the Ethernet frame is received by the AGF from the 5G-RG. The AGF processing of the received Ethernet frame first checks whether the Ethertype matches the 5G FMC UP encapsulation (and also PPPoE) (Block 201). If the Ethertype does not identify the received packet (also referred to as an Ethernet frame) as being 5G FMC UP encapsulation or PPPoE data packet (i.e., the Ethertype field value is not 0x8864), then the packet is processed as a non-5G FMC UP encapsulation/PPPoE data packet (Block 203). This may include PPPoE version 1 session processing in some embodiments. If the Ethertype does indicate that the packet is PPPoE/5G FMC UP encapsulation, then the VER field is examined to distinguish whether the packet is PPPoE or 5G FMC UP encapsulation (e.g., by testing whether the value is 2). If the VER value does not indicate 5G FMC UP encapsulation, then the packet may be processed as a version 1 PPPoE packet (Block 207).

Where the Ethertype and VER values indicate that the received packet has a 5G FMC UP encapsulation, then the AGF performs a session ID lookup and state update (Block 209). The session ID in the 5G FMC UP encapsulation is used to identify the session state information in a local data store 221. If the session identifier is not valid (e.g., the session identifier is not found in the session state information of the local data store), then the packet can be discarded (Block 211). If the PPP PID is not valid for the session, then packet can be discarded (Block 213).

Where the session ID and PPP PID for the received packet are valid, then the processing of the packet according to policies applicable to 5G FMC UP encapsulated packets is implemented. For example, the state information enables QoS processing for the 5G FMC UP encapsulated packet to be implemented (Block 223). A general packet radio service (GPRS) tunneling protocol (GTP)—user plane (U) packet (GTP-U) is then constructed for the received Ethernet packet (Block 225), and the packet is forwarded via GTP-U on the N3 interface of the AGF.

Figure 3:
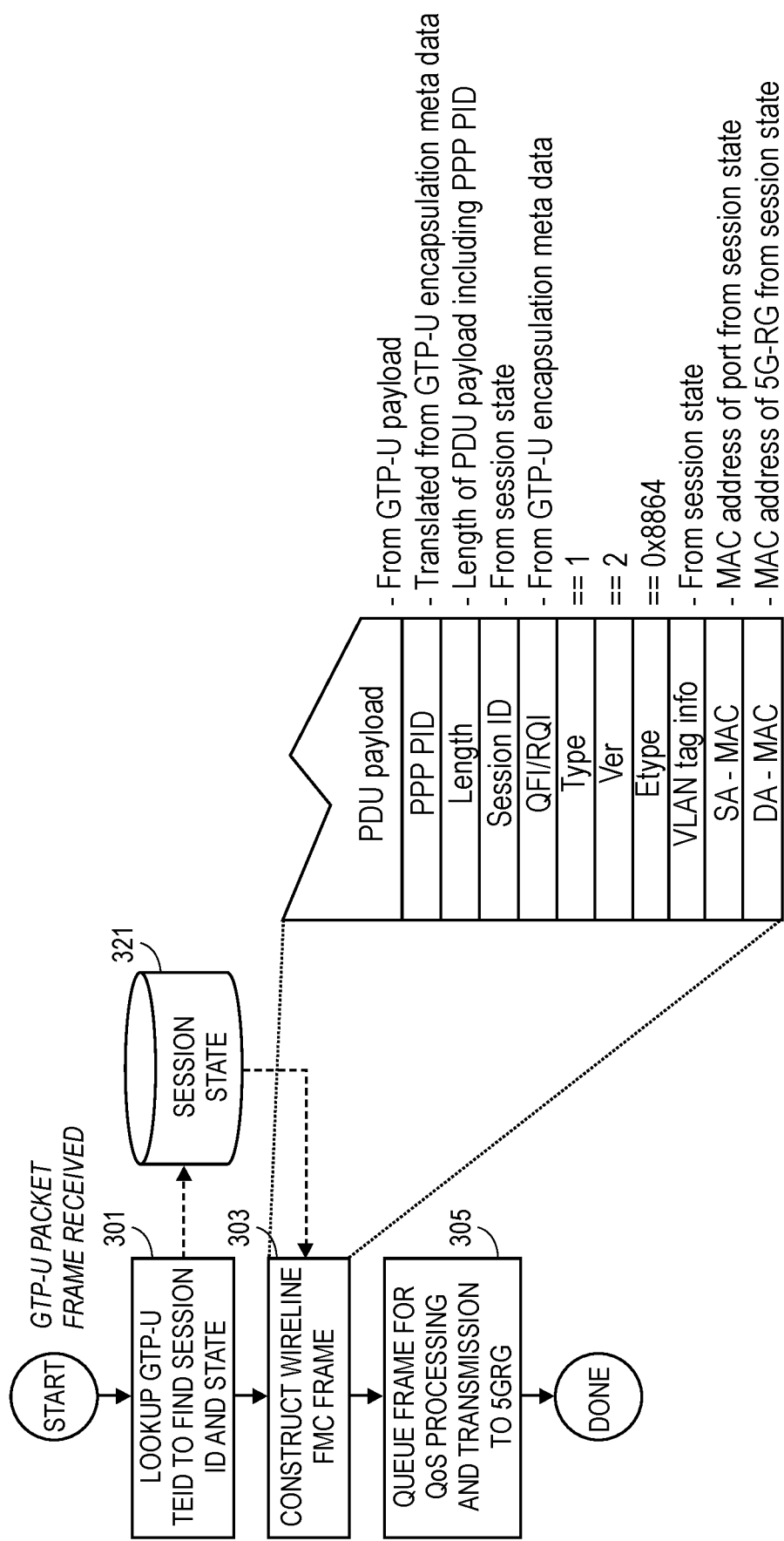
FIG. 3 is a flowchart of one embodiment of a processing of an Ethernet frame at an AGF received from the 5GC.

FIG. 3 is a flowchart of one embodiment of a processing of an Ethernet frame at an AGF received from the 5GC. This process is also implemented at the AGF for downstream traffic, rather than upstream traffic as is described above. The process is responsive to receiving a GTP-U encapsulated packet (also referred to as a frame) at the AGF. The AGF looks up the GTP-U tunnel endpoint identifier (TEID) for the session ID and state of the session associated with the received packet (Block 301). This information is retrieved from the session state information 221 in a local data store. This information also correlates the GTP-U session with the 5G FMC UP session. Where a matching session is found, then the AGF generates a wireline FMC frame (i.e., the GTP-U packet is being converted to an 5G FMC UP encapsulated packet) (Block 303). As illustrated, the payload of the 5G FMC UP encapsulated packet is copied from the GTP-U packet payload, the PPP PID is translated from the GTP-U encapsulation meta data, the length of the new payload is computed including the PPP PID, session ID is determined from the session state information, the TYPE and VER fields are set to indicate 5G FMC UP encapsulation, and the source and destination addresses are from session state including the destination being the 5G-RG. The converted packet is then queued for QoS processing and forwarding to the 5G-RG (Block 305).

Figure 4:
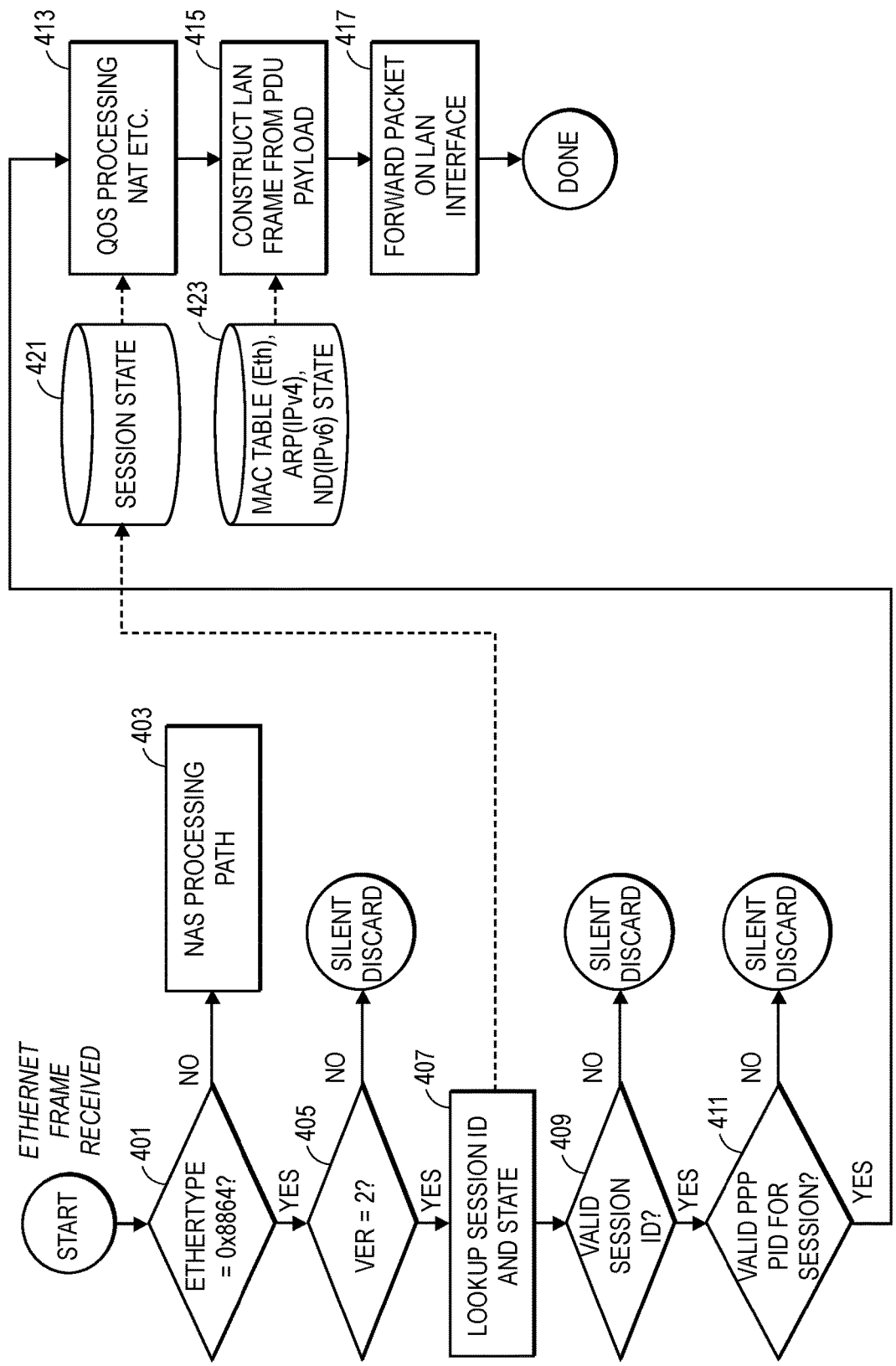
FIG. 4 is a flowchart of one embodiment of a processing of an Ethernet frame at the 5G-RG received from the AGF.

FIG. 4 is a flowchart of one embodiment of a processing of an Ethernet frame at the 5G-RG received from the AGF. The illustrated process is triggered by receiving a packet (also referred to here as a frame) from the AGF. The packet is inspected to determine the Ethertype value (Block 401). If the Ethertype value does not indicate that the packet is PPPoE or 5G FMC UP encapsulated, then the packet is processed as a NAS processing path (Block 403). If the Ethertype does indicate PPPoE/5G FMC UP encapsulation, then the VER value is inspected (Block 405). If the VER value does not indicate 5G FMC UP encapsulation, then the packet is discarded or processed as a PPPoE packet (e.g., where a PPPoE version 1 encapsulation of NAS is a valid embodiment). If the VER value does indicate that the packet is 5G FMC UP encapsulated, then the session ID is looked up in the session state information in a local data store 421 (Block 407). A check is made to determine if the session ID is valid (e.g., was the session ID found in the session state information) (Block 409). If the session state ID is not valid, then the received packet can be discarded. A check is also made whether, the PPP PID session is valid, where invalid PPP PIDs are also discarded (Block 411).

Where the received packet has a valid session ID and PPP PID, then the packet is processed according to QoS, network address translation (NAT), and similar functions of the 5G-RG (Block 413). The 5G-RG then converts the received packed to a format for the local LAN of the residence (Block 415). The conversion can copy the PDU payload as the new payload and look up the MAC address, ARP, network discovery and similar state and session information maintained by the 5G-RG to complete the conversion and to then forward the converted packet on the LAN (Block 417).

Figure 5:
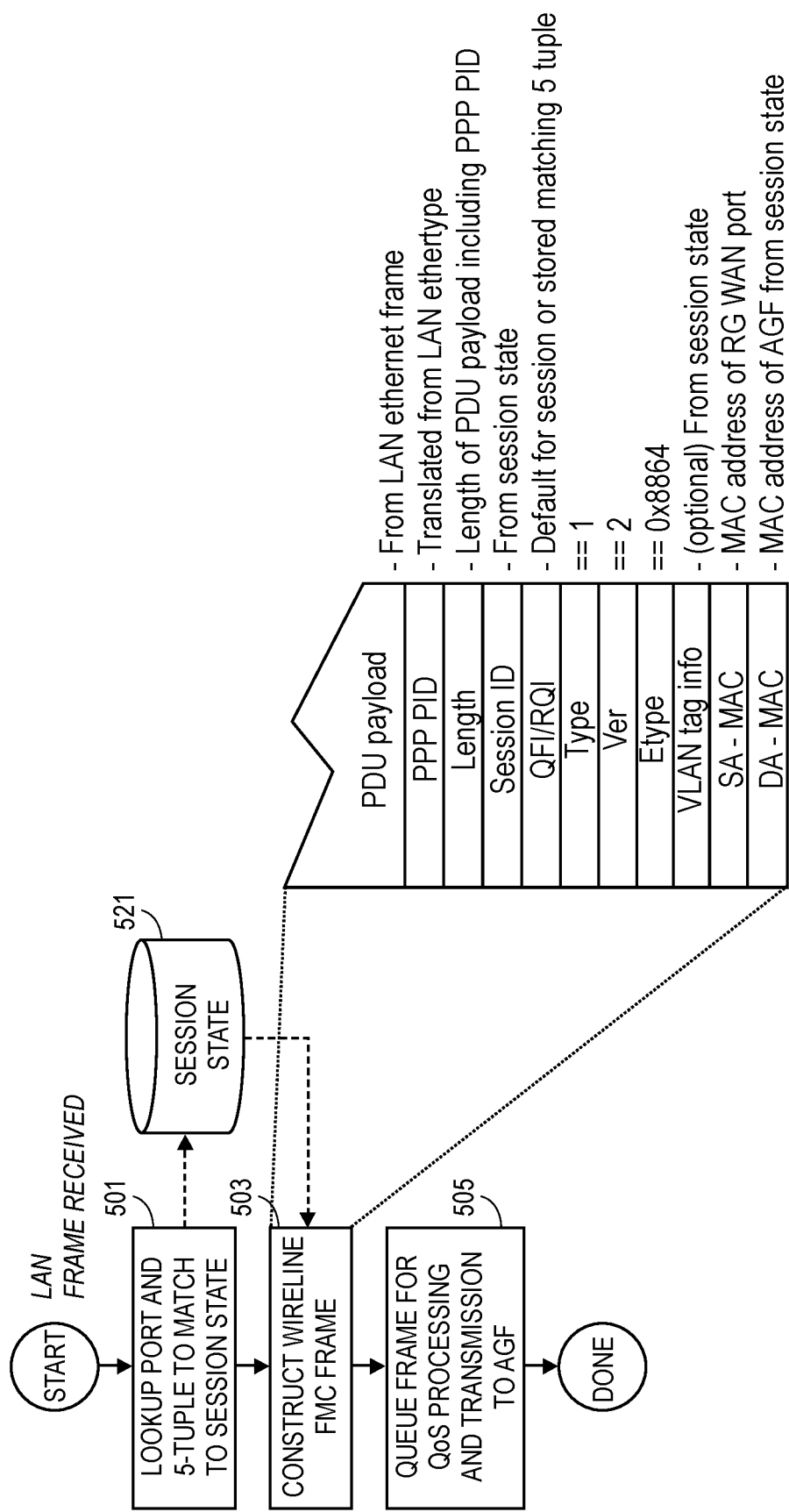
FIG. 5 is a flowchart of one embodiment of a processing of an Ethernet frame at the 5G-RG received from user equipment.

FIG. 5 is a flowchart of one embodiment of a processing of an Ethernet frame at the 5G-RG received from user equipment. This process is also implemented at the 5G-RG for upstream traffic, rather than downstream traffic as is described above. The process is responsive to receiving a LAN (also referred to as a frame) at the 5G-RG from a user device. The 5G-RG looks up the physical/logical port and possibly the 5 tuple information (e.g., source address (SA), destination address (DA), protocol and protocol ports) in the received packet's IP header to determine the session ID and state for the session associated with the received packet (Block 501). This information is retrieved from the session state information 421 in a local data store. This information also correlates the packet with a 5G FMC UP session. Where a matching session is found, then the 5G-RG generates a wireline FMC frame (i.e., the LAN packet is being converted to an 5G FMC UP encapsulated packet) (Block 503). As illustrated, the payload of the 5G FMC UP encapsulated packet is copied from the LAN Ethernet packet payload, the PPP PID is translated from the LAN Ethertype, the length of the new payload is computed including the PPP PID, session ID is determined from the session state information, the TYPE and VER fields are set to indicate 5G FMC UP encapsulation, and the source and destination media access control (MAC) addresses are from session state including the destination being the AGF. The converted packet is then queued for QoS processing and forwarding to the AGF (Block 505).

Figure 6:
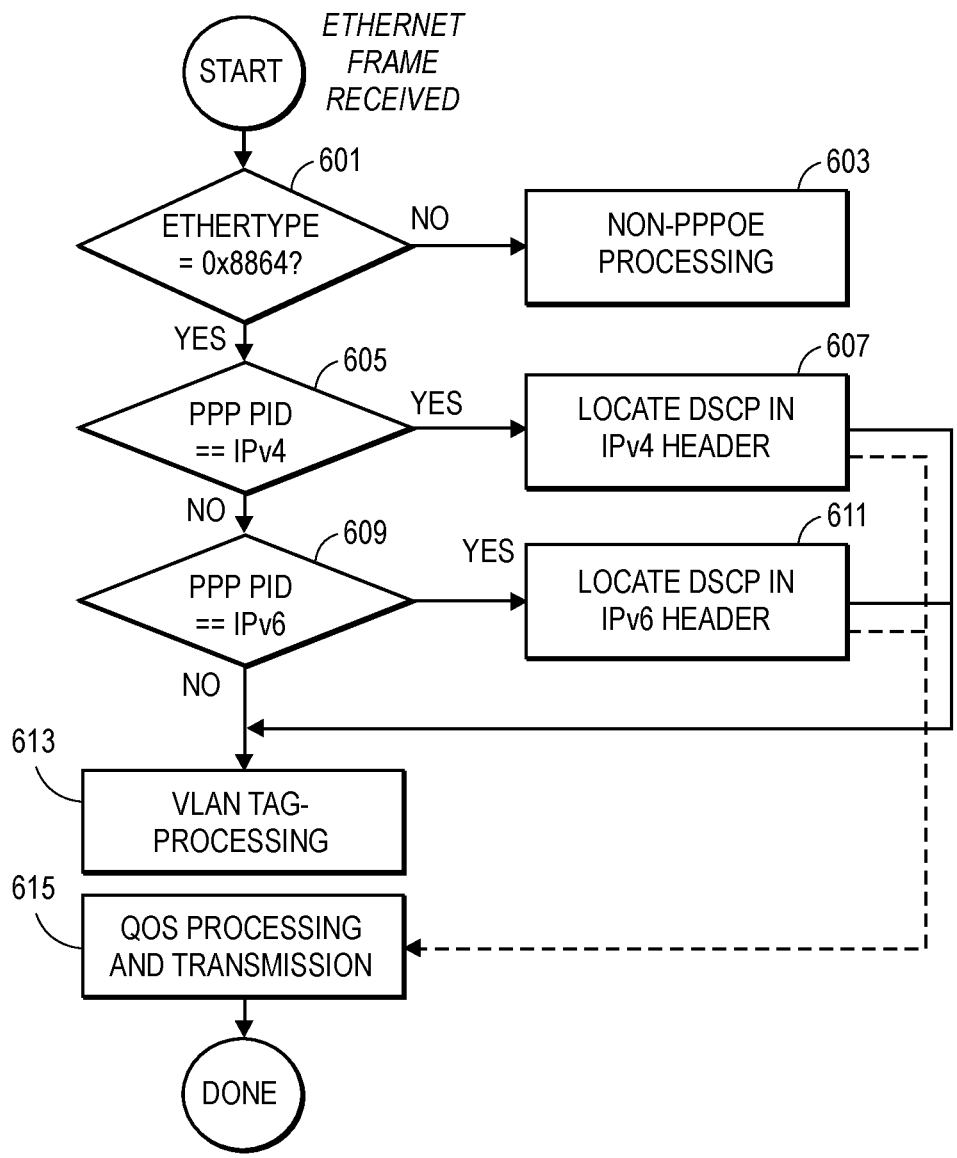
FIG. 6 is a flowchart of one embodiment of a process of an Ethernet frame at a legacy access node.

FIG. 6 is a flowchart of one embodiment of a process of an Ethernet frame at a legacy access node. The example process illustrates that the legacy access nodes can implement some value added proprietary features and are able to relay 5G FMC UP encapsulated packets as PPPoE packets without disrupting their operation or requiring updating for support of 5G FMC UP encapsulation. The legacy nodes process received Ethernet packets by checking the Ethertype (Block 601), where non-PPPoE packets are processed according to their packet type (Block 603). No check is made of 5G FMC UP encapsulation modified fields such as VER, TYPE and CODE. The PPP PID is checked (Block 605) to locate a differentiated service code point (DSCP) for IPv4 (Block 607), and checked (Block 609) to locate DSCP in an IPv6 header (Block 611), before VLAN tag processing (Block 613), QoS processing (615), and packet forwarding.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). The network software 720 can include 5G FMC UP manager 721, which implements the 5G FMC UP encapsulation and processing thereof (i.e., any one or more of the process illustrated in FIGS. 2-5) as described herein above for any of the 5G-RG, AGF, or other nodes supporting the 5G FMC UP encapsulation and related services in a provider network or in communication therewith.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers). The software 750 can include 5G FMC UP manager 721, which implements the 5G FMC UP encapsulation and processing thereof (i.e., any one or more of the process illustrated in FIGS. 2-5) as described herein above for any of the 5G-RG, AGF, or other nodes supporting the 5G FMC UP encapsulation and related services in a provider network or in communication therewith.

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
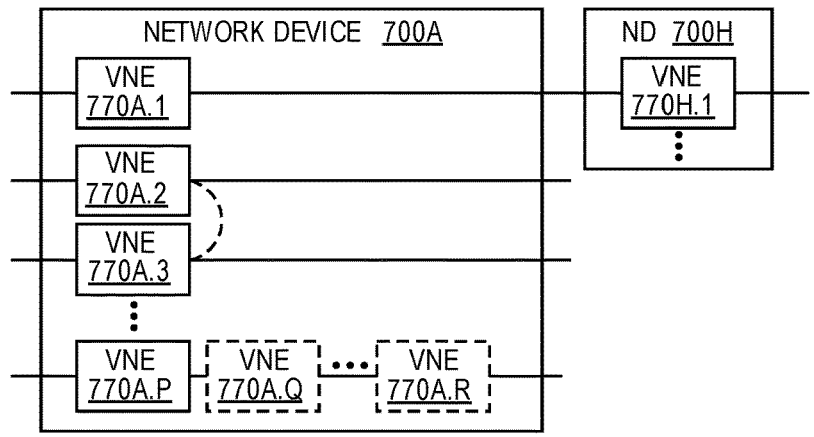
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
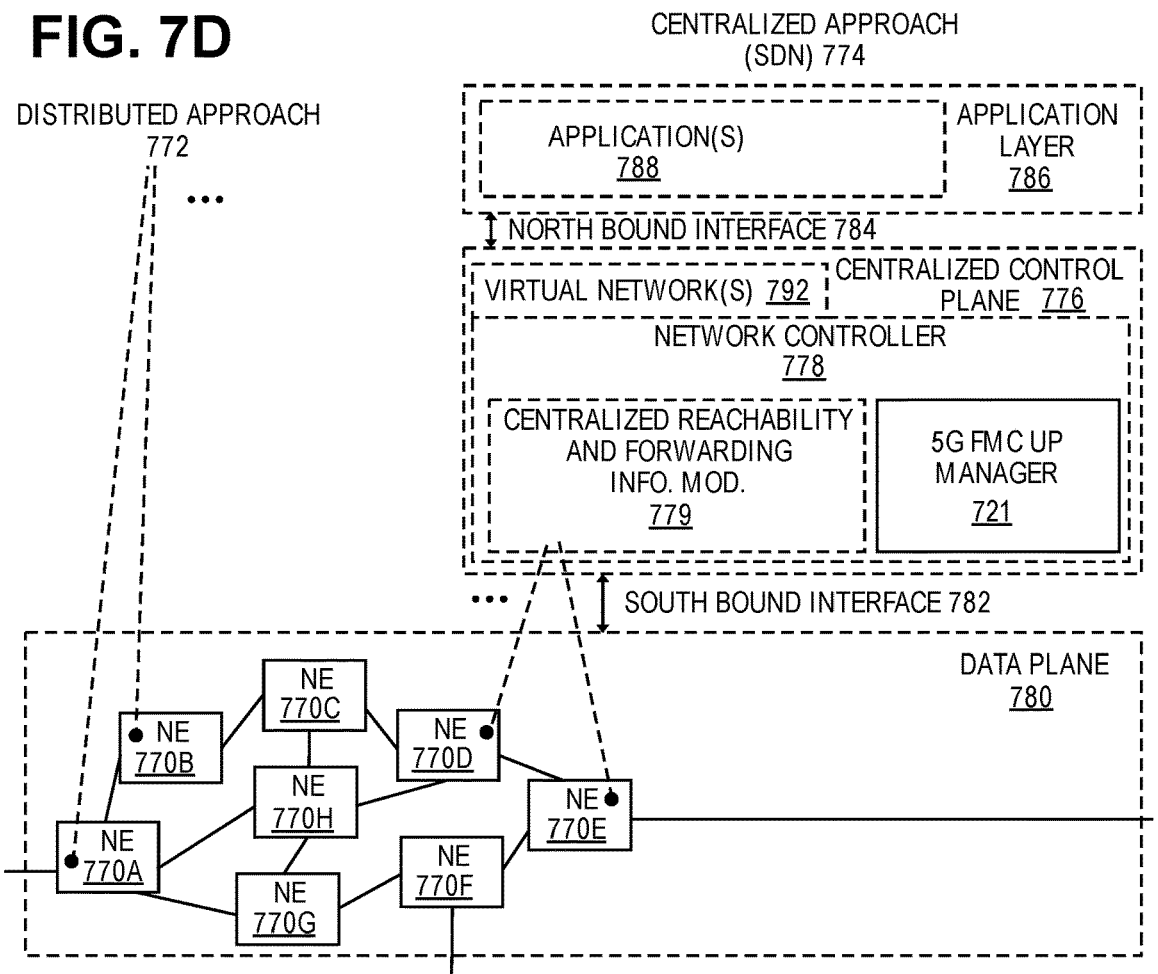
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. The network controller 778 or related aspects of the centralized control plane 776 or application layer 786 can include 5G FMC UP manager 721, which implements the 5G FMC UP encapsulation and processing thereof (i.e., any one or more of the process illustrated in FIGS. 2-5) as described herein above for any of the 5G-RG, AGF, or other nodes supporting the 5G FMC UP encapsulation and related services in a provider network or in communication therewith.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
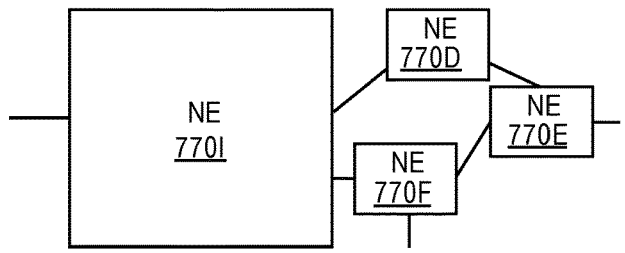
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
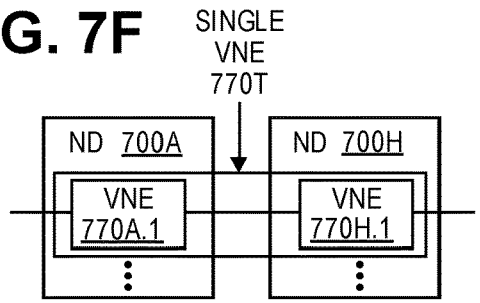
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
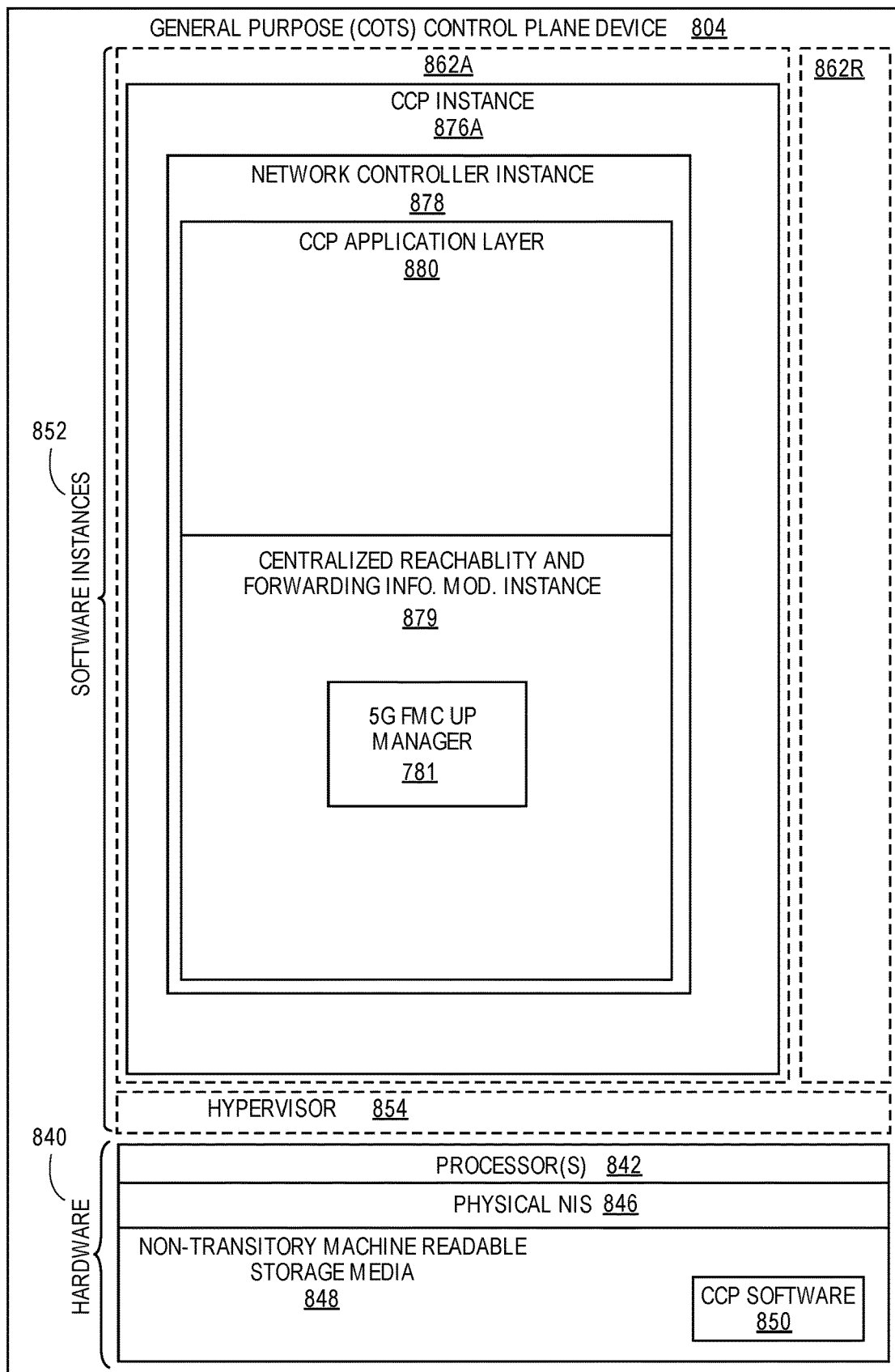
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view. The centralized reachability and forwarding information module 879 or other aspect of the CCP software 850 can include 50 FMC UP manager 821, which implements the 5G FMC UP encapsulation and processing thereof (i.e., any one or more of the process illustrated in FIGS. 2-5) as described herein above for any of the 5G-RG, AGF, or other nodes supporting the 5G FMC UP encapsulation and related services in a provider network or in communication therewith.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an LP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device comprising:
   receiving a packet at an access gateway function from a residential gateway;
   detecting an Ethertype for the received packet;
   detecting a version for the received packet;
   looking up session and state information for the packet as a result of the detecting of the Ethertype and the version indicating that the packet is a fixed mobile convergence (FMC) user plane (UP) encapsulation; and
   processing the packet according to policies for FMC UP encapsulation.

2. The method of claim 1, further comprising:
   performing quality of service (QoS) processing based on the session and state information.

3. The method of claim 1, further comprising:
   constructing a general packet radio service (GPRS) tunneling protocol (GTP) user plane (U) packet (GTP-U) for the received packet; and
   forwarding the received packet via GTP-U on an N3 interface.

4. The method of claim 1, further comprising:
   receiving a second packet at the access gateway function from a network core;
   determining a session ID for the received packet for the FMC UP encapsulation using meta data from a GTP-U header of the received packet;
   generating an FMC UP packet populated with a payload from the received packet and header information derived from the GTP-U header; and
   forwarding the FMC UP encapsulated packet to a residential gateway.

5. The method of claim 4, wherein the FMC UP encapsulation includes a point to point protocol over Ethernet (PPPOE) version value of 2.

6. A network device to implement a method to support fixed mobile convergence (FMC) with user plane (UP) encapsulation, the network device comprising:
   a non-transitory computer readable medium having stored therein a FMC UP manager; and
   a processor coupled to the non-transitory computer readable medium, the processor to execute the FMC UP manager, FMC UP manager to receive a packet at an access gateway function from a residential gateway, to detect an Ethertype for the received packet, to detect a version for the received packet, to look up session and state information for the packet as a result of the detecting of the Ethertype and the version indicating that the packet is a FMC UP encapsulation, and to process the packet according to policies for FMC UP encapsulation.

7. The network device of claim 6, wherein the FMC UP manager is further to enable quality of service (QoS) processing based on the session and state information.

8. The network device of claim 6, wherein the FMC UP manager is further to construct a general packet radio service (GPRS) tunneling protocol (GTP) user plane (U) packet (GTP-U) for the received packet, and to forward the received packet via GTP-U on an N3 interface.

9. The network device of claim 6, wherein the FMC UP manager is further to receive a second packet at the access gateway function from a network core, to determine a session ID for the received packet for the FMC UP encapsulation using meta data from a GTP-U header of the received packet, to generate an FMC UP packet populated with a payload from the received packet and header information derived from the GTP-U header, and to forward the FMC UP encapsulated packet to a residential gateway.

10. The network device of claim 9, wherein the FMC UP encapsulation includes a point to point protocol over Ethernet (PPPOE) version value of 2.

11. A method implemented by a network device comprising:
receiving a packet at a residential gateway from an access gateway function;
detecting an Ethertype for the received packet;
detecting a version for the received packet;
looking up session and state information for the packet as a result of the detecting of the Ethertype and the version indicating that the packet is a fixed mobile convergence (FMC) user plane (UP) encapsulation;
processing the packet according to policies for FMC UP encapsulation; and
generating a local area network packet from the packet by copying the payload of the packet and determining local area network packet header information from session information.

12. The method of claim 11, further comprising:
performing quality of service (QoS) processing based on the session and state information.

13. The method of claim 11, further comprising:
constructing a local area network (LAN) frame from payload of the packet; and
forwarding the LAN frame on LAN interface.

14. The method of claim 11, further comprising:
receiving a second packet at a residential gateway from a user device in a local area network;
determining a session ID for the second packet for FMC UP encapsulation using header data from the second packet;
generating a FMC UP encapsulated packet populated with a payload from the second packet and header information derived from session state; and
forwarding the FMC UP encapsulated packet to an access gateway function.

15. The method of claim 14, wherein the FMC UP encapsulation includes a point to point protocol over Ethernet (PPPOE) version value of 2.

16. A network device to implement a method to support fixed mobile convergence (FMC) with user plane (UP) encapsulation, the network device comprising:
a non-transitory computer readable medium having stored therein a FMC UP manager; and
a processor coupled to the non-transitory computer readable medium, the processor to execute the FMC UP manager, the FMC UP manager to receive a packet at a residential gateway from an access gateway function, to detect an Ethertype for the received packet, to detect a version for the received packet, to look up session and state information for the packet as a result of the detecting of the Ethertype and the version indicating that the packet is a fixed mobile convergence (FMC) user plane (UP) encapsulation, to process the packet according to policies for FMC UP encapsulation, and to generate a local area network packet from the packet by copying the payload of the packet and determining local area network packet header information from session information.

17. The network device of claim 16, wherein the FMC UP manager is further to perform quality of service (QoS) processing based on the session and state information.

18. The network device of claim 16, wherein the FMC UP manager is further to perform construct a local area network (LAN) frame from payload of the packet, and to forward the LAN frame on LAN interface.

19. The network device of claim 16, wherein the FMC UP manager is further to receive a second packet at a residential gateway from a user device in a local area network, to determine a session ID for the second packet for FMC UP encapsulation using header data from the second packet, to generate a FMC UP encapsulated packet populated with a payload from the second packet and header information derived from session state, and to forward the FMC UP encapsulated packet to an access gateway function.

20. The network device of claim 19, wherein the FMC UP encapsulation includes a point to point protocol over Ethernet (PPPOE) version value of 2.

* * * * *